(12) United States Patent
Bauhofer et al.

(10) Patent No.: US 11,063,469 B2
(45) Date of Patent: Jul. 13, 2021

(54) UNINTERRUPTIBLE POWER SUPPLY SYSTEM AND METHOD FOR RECONDITIONING AN EXHAUSTED BATTERY MODULE

(71) Applicant: Siemens Aktiengesellschaft, Munich (DE)

(72) Inventors: Michael Bauhofer, Zwölfaxing (AT); Daniel Portisch, Kleinhadersdorf (AT)

(73) Assignee: Siemens Aktiengesellschaft, Munich (DE)

( * ) Notice: Subject to any disclaimer, the term of this patent is extended or adjusted under 35 U.S.C. 154(b) by 132 days.

(21) Appl. No.: 16/553,620

(22) Filed: Aug. 28, 2019

(65) Prior Publication Data

US 2020/0076230 A1 Mar. 5, 2020

(30) Foreign Application Priority Data

Aug. 29, 2018 (EP) ..................... 18191389

(51) Int. Cl.
  *H02J 7/00* (2006.01)
  *H02J 9/06* (2006.01)
(52) U.S. Cl.
  CPC ............ *H02J 9/061* (2013.01); *H02J 7/0034* (2013.01); *H02J 7/0047* (2013.01)
(58) Field of Classification Search
  CPC ....................................... H02J 9/061
  USPC ............................................................ 307/66
  See application file for complete search history.

(56) References Cited

U.S. PATENT DOCUMENTS 9,680,333 B1 6/2017 Brooks et al.

FOREIGN PATENT DOCUMENTS

EP 2113982 11/2009
GB 2542424 3/2017

*Primary Examiner* — Rexford N Barnie
*Assistant Examiner* — Dru Parries
(74) *Attorney, Agent, or Firm* — Cozen O'Connor (57) ABSTRACT

Uninterruptible power supply system and method for reconditioning an exhausted battery module, wherein a terminal voltage of the battery module is determined and compared with a predefinable threshold value after starting a network-side supply, where after a waiting time has elapsed, when the threshold value is fallen below, an inverse polarity protection unit is activated for a time pulse, such that when communication between the base unit and the battery module occurs, the inverse polarity protection unit is permanently switched on and a voltage drop is determined and compared within the battery module with a predefined minimum voltage, and if at least one determined voltage drop falls below the predefined minimum voltage, then a predefined charging voltage is applied to the battery module until either a predefinable period of time is exceeded or a predefinable current value is surpassed by a charging current determined in the base unit.

18 Claims, 3 Drawing Sheets

UNINTERRUPTIBLE POWER SUPPLY SYSTEM AND METHOD FOR RECONDITIONING AN EXHAUSTED BATTERY MODULE

BACKGROUND OF THE INVENTION

1. Field of the Invention

The present invention generally relates to uninterruptible power supply (UPS) systems and, more particularly, to a method for reconditioning an exhausted battery module in an uninterruptible power supply system, and to an associated uninterruptible power supply system for performing the method in accordance with the invention. In this context, the uninterruptible power supply system comprises at least one base unit and also at least one battery module with at least two accumulator units, which each have associated internal exhaustive discharge monitoring. The at least one battery module is linked to the base unit via connection lines and can be attached such that it is spatially separated therefrom.

2. Description of the Related Art

Nowadays in many electrical systems, power supplies are frequently installed that are fed by a three-phase energy supply network, in particular a three-phase network, and deliver a DC output voltage (e.g., 24 volt DC voltage) for supplying the electrical system. In order to ensure operation of the electrical system or the respective load independently of interruptions and/or failures in the energy supply network, uninterruptible power supply systems (UPS for short) are conventionally used. The uninterruptible power supply serves to provide an auxiliary energy supply for the electrical system or the connected load even in the event of an interruption or a failure of the normal energy supply. To this end, a typical uninterruptible power supply system consists of a base unit and one or more battery modules, which are connected to the base unit via connection lines. Battery modules provide DC voltage. Consequently, the connection lines or the associated terminals of a battery module have a polarity, i.e., there is a positive connection line or terminal and a negative connection line or terminal, where the negative connection line can be connected to a ground potential of the base unit, for instance.

The base unit is connected on the input side to the power supply on one side, and on the output side to a load to be supplied. The base unit comprises at least one charging unit or charge regulator, a control unit and also a switchover unit. The charging unit or the charge regulator is used to charge the connected battery module or the connected battery modules during the network-linked operation, for instance, and also to implement a charging process and optionally a discharging process (e.g., to adapt the battery voltage to a desired load voltage level, e.g., of a step-up or step-down converter). On the part of the control unit, an actuation of the charging unit or the charge regulator and the switchover unit occurs based on current and voltage measurement values. With the aid of the switchover unit, in the event of an interruption to the energy supply network, it is possible to switch from what is known as a network-linked operation (i.e., supplying the load from the energy supply network) to what is known as backup operation. In the "backup operation", the energy supply to the connected load is provided (at least briefly) by the at least one battery module.

The at least one battery module comprises at least one accumulator unit or what is known as a rechargeable battery pack for energy storage purposes. In a battery module, at least two or more accumulator units or rechargeable battery packs are frequently arranged in series. An accumulator unit or a rechargeable battery pack is an interconnected bundle of a plurality of accumulator cells, which are retained by an enclosure and protected from external influences. The accumulator unit constitutes a rechargeable store for electrical energy, typically based on an electrochemical system, by way of which electrical energy is converted into chemical (stored) energy during charging and converted back into electrical energy during discharging. Accumulator cells are usually referred to according to the materials used in each case. Known accumulator cell types are, e.g., lithium iron phosphate accumulators (LiFePO4 accumulators), lithium ion accumulators, lead accumulators, etc.

In an industrial application of uninterruptible power supply systems, the base unit and the at least one battery module may be arranged spatially separated from one another. The base unit with charging unit, control unit and switchover unit is situated, for instance, in a housing which is mounted, e.g., in a switchgear cabinet on a DIN rail. The associated battery module or the associated battery modules may, e.g., be attached at the bottom of the switchgear cabinet or at another point, due to the lower temperature level.

Without interruptions to the energy supply, the uninterruptible power supply conveys electrical energy both to the connected load and also to the at least one associated battery module, and thus to the accumulator units of the battery module, i.e., the battery module or the accumulator units are charged. If an interruption to the energy supply occurs, the at least one battery module of the uninterruptible power supply system is connected to the load and begins to discharge to the load, in order to maintain the electrical energy supply. When the energy supply network returns to its normal state once more, the load and the at least one battery module are supplied with electrical energy again.

In the event of an interruption to the energy supply, the at least one battery module may only be used for a limited time, however, as otherwise this may lead to what is known as an exhaustive discharge of at least one, possibly even a plurality of accumulator units of the battery module. There are further reasons for an exhaustive discharge of an accumulator unit, however, such as obsolescence of the respective accumulator unit, a defective and inadequate charging unit, passive current drain through a device, or what is known as self-discharge, which may occur, e.g., during longer storage periods or over longer transport routes. Self-discharge refers to processes happening of their own accord, which may lead to an accumulator unit discharging more or less rapidly even without a connected load. In this context, a self-discharge of a battery is all the more critical, the lower the respective charge state of the battery module. In a low charge state, even a relatively short storage or transport time may lead to an exhaustive discharge of the battery module, for instance.

Due to an exhaustive discharge, i.e., during a current drain up to almost complete depletion of the capacity of the respective accumulator unit, the respective accumulator unit may be irreversibly damaged or its service life and storage capacity may be reduced. It may be that recharging may no longer be possible. In some types of accumulators, such as lithium ion accumulators, exhaustive discharge may lead to unstable states, more pronounced heating and/or short-circuits when recharging. Therefore, a discharging process should be terminated when what is known as a final discharge voltage is reached or exceeded, or an accumulator unit should be checked for exhaustive discharge before use. The final discharge voltage is a predefined characteristic value of the respective accumulator unit, which depends upon the respective type of rechargeable battery. Thus, for instance, lithium ion accumulators or LiFePO4 accumulators have a final discharge voltage of 2 to 2.5 V.

In order to prevent an exhaustive discharge of an accumulator unit or the use thereof in the exhausted state, accumulator units may have internal protective electronics with what is known as exhaustive discharge monitoring, for instance. By way of exhaustive discharge monitoring of this kind, when a predefined voltage value is reached or fallen below (usually the final discharge voltage), a discharge process can be stopped and, optionally, a charging current for recharging said accumulator unit can be limited. With the exhaustive discharge monitoring, the accumulator unit may be switched into a protection mode, for instance, in which a discharging is interrupted and a recharging via an unlimited charging current is prevented or only made possible in a risk-free manner with a limited charging current. Known from publication EP 2 113 982 B1, for instance, are internal protective electronics for an accumulator unit, in particular a rechargeable battery pack for lithium ion accumulator cells, which in addition to charge monitoring also enable exhaustive discharge monitoring based on voltage monitoring at the respective accumulator cells of the accumulator unit.

When using accumulator units of this kind with internal exhaustive discharge monitoring in a battery module in an uninterruptible power supply, this may lead to problems during charging or recharging the at least one battery module by way of the base unit or the charging unit of the uninterruptible power supply, if one or more accumulator units are switched into a protection mode by the respective internal exhaustive discharge monitoring, e.g., due to longer storage periods, a long transport route or by not charging in time after a normal discharge, etc. For instance, no terminal voltage or only a very low terminal voltage may be measured at the terminals, on the basis of which, e.g., a connection of the battery module to the correct polarities can no longer be ascertained, or whereby, e.g., an inverse polarity protection facility in the base unit can no longer be switched off. As a result, the at least one battery module or the associated accumulator units can no longer be charged via the base unit or by means of the charging unit of the uninterruptible power supply system and brought into normal operation, for instance, and therefore must be replaced, which causes additional expenditures and costs.

SUMMARY OF THE INVENTION

In view of the foregoing, it is therefore an object of the invention to provide a method for reconditioning an exhausted battery module in an uninterruptible power supply system, and to provide an associated uninterruptible power supply system, by way of which an exhausted battery module in an uninterruptible power supply system can be again returned to a chargeable state, in particular normal operation, in a simple and cost-effective manner.

This and other objects and advantages are achieved in accordance with the invention by a method for reconditioning an exhausted battery module in an uninterruptible power supply system, where after starting or switching on a network-side energy supply, a terminal voltage of the at least one battery module is determined, e.g., at the positive connection line or terminal of the battery module. This terminal voltage is compared with a predefinable threshold value. Once a predefinable waiting time (e.g., 10 minutes) has elapsed, and when the threshold value is fallen below, an inverse polarity protection unit is activated for a predefinable, very short period of time or a predefinable time pulse (e.g., 0.5 seconds), where the inverse polarity protection unit is arranged in one of the connection lines between the base unit and the at least one battery module. If a communication is ascertained between the base unit and the at least one battery module of the power supply system, then the inverse polarity protection unit is switched on permanently and a respective voltage drop is determined in at least one battery module via a load network at each of the at least two accumulator units. The respective voltage drop at the respective accumulator unit is then compared with a predefined minimum voltage. If at least one of the voltage drops determined at the respective accumulator units falls below the predefined minimum voltage, then a predefined charging voltage is applied to the at least one battery module until either a predefinable period of time (e.g. 12 hours) is exceeded or a predefinable current value (e.g. 500 mA) is surpassed by a charging current determined in the base unit.

The main aspect of the method in accordance with the invention consists in the fact that, on the one hand, it is possible to ascertain whether a battery module is actually defective or only one or more accumulator units have been switched by the respective internal exhaustive discharge monitoring into a protection mode, e.g., due to a long storage period, longer transport routes or not charging in time after usage in accordance with normal operating conditions. In the protection mode, for instance, the internal exhaustive discharge monitoring suppresses a discharging of the respective accumulator unit and limits a charging current to an uncritical value for the respective type of rechargeable battery. On the other hand, by way of the method in accordance with the invention, a battery module of an uninterruptible power supply system, in which at least one accumulator unit has been activated by the respective internal exhaustive discharge monitoring, can be again transferred into a chargeable state or normal charging operation in a simple manner and can be recharged. In a normal charging operation, for instance, the battery module is charged at a predefined charging voltage and a predefined maximum charging current, which are defined by the respective types of accumulators. The battery module is thus able to be used in the uninterruptible power supply system again and does not need to be replaced, for instance.

Ideally, to determine the respective voltage drop at the respective accumulator unit, load units are connected by the load network according to a predefinable order. In this context, e.g., starting from a first load unit, in accordance with the predefinable order, for instance, a further load unit is always connected. To this end, the load network is arranged in parallel with the at least two accumulator units, for instance, where the load units are arranged, e.g., in series and each comprises at least one resistor and a switching element arranged in series with the resistor.

Furthermore, it is advantageous if, before each charging process of the battery module, e.g., when applying the network-side energy supply after backup operation, or after connecting a new battery module to the base unit of the uninterruptible power supply system, the respective voltage drops at the at least two accumulator units of the battery module are determined with the aid of the load network. In this simple manner, it is possible to rapidly ascertain whether at least one accumulator unit has been switched into a protection mode by the internal exhaustive discharge monitoring.

In a favorable embodiment of the method in accordance with the invention, what is known as an exhaustive discharge state is indicated by the at least one battery module during the predefinable period of time or as long as the predefinable current value has not been exceeded by the charging current determined in the base unit. This means that it is thus very rapidly visible that the battery module or the uninterruptible power supply system is situated in a state in which an exhausted battery module can be reconditioned. If, once the predefinable period of time (e.g., 12 hours) has expired, the predefinable current value has still not yet been exceeded by the charging current determined in the base unit, then a "defective battery" state is advantageously indicated by the battery module. Thus, it is unambiguously visible to a user that the battery module is defective or can no longer be brought into normal charging operation and must be replaced. Advantageously, it can be indicated via a display unit (e.g. via optical signaling, or a screen of an output device) which of the at least two accumulator units of the battery module are to be changed. When using a screen of an output device as display unit, this may be connected to the uninterruptible power supply system, e.g., via a bus system (e.g., Profinet, etc.) and placed, e.g., at a central controller.

In one preferred embodiment of the method in accordance with the invention, when the predefinable current value is surpassed by the charging current determined in the base unit, a switch to a normal charging operation occurs and the normal charging operation is indicated by the at least one battery module. This means that the battery module is charged at a predefined charging voltage and a predefined maximum charging current, for instance, which are defined by the respective types of accumulator. Before switching from what is known as the exhaustive discharge state into the normal charging operation, for instance, a certain period of time (e.g., 1 minute) can be waited, in order to exclude possible interruptions or false measurements when determining the charging current in the base unit, for instance.

It is also an object of the invention to provide an uninterruptible power supply system for performing the method in accordance with the invention, where the uninterruptible power supply system comprises at least one base unit and at least one battery module, which has at least two accumulator units with associated exhaustive discharge monitoring in each case. The at least one battery module is linked to the base unit via connection lines (at least one positive and one negative connection line).

In this context, the base unit furthermore has an inverse polarity protection unit, which is arranged in one of the connection lines, and via which a connection with swapped polarities of the at least one battery module to the base unit (i.e., swapping positive and negative connection line or terminal) is intended to be prevented. The inverse polarity protection unit is advantageously designed as a switching unit, in particular as a relay, bipolar transistor or field-effect transistor (e.g., metal oxide semiconductor field-effect transistor (MOS-FET). The inverse polarity protection unit is, for instance, permanently switched on or closed, if it can be ascertained, e.g., based on the determined terminal voltage of the battery module, where the battery module is connected to the base unit with the correct polarities.

Furthermore, the at least one battery module has a load network for determining voltage drops at each of the at least two accumulator units. In addition, for communication between the base unit and the at least one battery module, at least one communication connection is provided for exchanging control signals. In this context, the communication connection uses the connection lines, in which the inverse polarity protection unit is arranged, as a signal basis or as a return line for the communication.

Furthermore, the base unit of the uninterruptible power supply system may ideally comprise at least one charging unit for implementing charging and discharging processes and a control unit for actuating the charging unit and for evaluating the measurement values. Moreover, the base unit comprises a switchover unit, with which the supply of the load can be switched between a network-supplied power supply and a power supply by the battery module. In at least one battery module, a controller unit may furthermore be provided for communicating with the base unit and also for actuating the load network and evaluating the voltage drops determined via the load network.

Furthermore, it is favorable if the at least one battery module has a display unit, via which a current state of the at least one battery module can be indicated. With the aid of the display unit, it is possible to indicate a current state or status of the battery module, such as "defective battery module", "battery module in exhaustive discharge state" or "battery module in charging operation" in a simple and cost-effective manner. Light-emitting diodes, which indicate the respective state or status of the battery module by color and/or flashing signals, may be used as display unit for instance.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described by way of example making reference to the accompanying figures, in which.

DETAILED DESCRIPTION OF THE EXEMPLARY EMBODIMENTS

Figure 1:
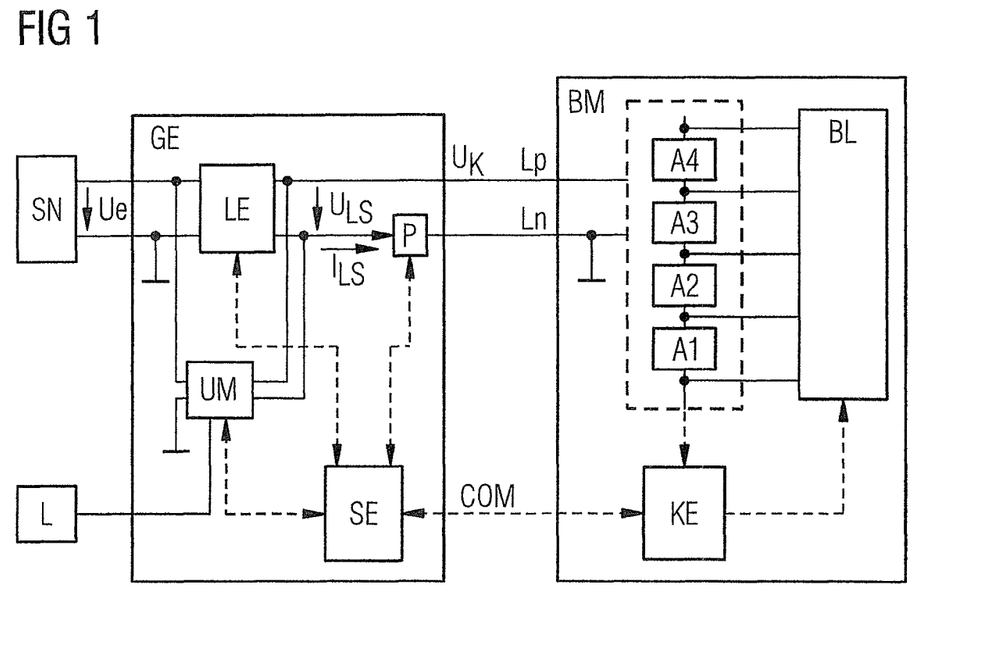
FIG. 1 shows a schematic and exemplary representation of an uninterruptible power supply system in accordance with the invention.

FIG. 1 shows an uninterruptible power supply system in accordance with the invention in a schematic and exemplary manner, by which, in the event of a failure of or an interruption to a supplying power network, in particular three-phase network, a supply to a load L (e.g., electrical system) can be maintained. The uninterruptible power supply system is connected to the supply network (usually a three-phase network) via a switched-mode power supply SN. A multi-phase AC voltage (usually a three-phase AC voltage) is converted into a DC voltage Ue (e.g., 24 V) at the output of the switched-mode power supply SN by the switched-mode power supply SN.

The uninterruptible power supply system has at least one base unit GE and also at least one battery module BM. In this context, the base unit GE and the battery module BM are attached such that they are spatially separated from one another. The base unit GE and the battery module BM are connected via at least two connection lines (a positive connection line Lp and a negative connection line Ln), where the negative connection line Ln can be connected to a ground potential. Furthermore, it is important for a functionality of the power supply that the connection lines Lp, Ln connect the base unit GE and the battery module BM to the correct polarities. This means that the positive connection line Lp should connect a positive terminal of the base unit GE to a positive terminal of the battery module BM. Via the negative connection line Ln, the negative terminal of the base unit GE, which can also be linked to a ground potential, should be connected to the negative terminal of the battery module BM, which likewise can be linked to a ground potential.

In order to prevent the polarities from being swapped, an inverse polarity protection unit P is provided at the base unit GE. The inverse polarity protection unit P is arranged in one of the at least two connection lines Lp, Ln, e.g., as shown in FIG. 1 in the negative connection line Ln or in the negative terminal of the base unit GE. The inverse polarity protection unit P may be embodied as a switching element (e.g., relay, transistor, or MOS-FET).

The base unit GE furthermore comprises at least one control unit SE and a charging unit LE. The control unit SE may comprise a microcontroller, for instance, and serves to actuate the charging unit LE and also to evaluate measurement values (e.g., voltage and/or current values). Via the charging unit LE, charging and/or discharging processes of the at least one battery module BM are regulated, i.e., the charging unit LE ensures that a charging current $I_{LS}$ and/or a charging voltage $U_{LS}$ or a discharging current and/or a discharging voltage remain within predefined limits. The limits for current and voltage, such as a level of the charging current (e.g., maximum/minimum charging current), or permissible final discharge voltage, may be transferred from the at least one battery module BM to the base unit GE at the point in time of starting up the power supply system, or e.g., permanently set by the operator at the time of installation or commissioning.

Furthermore, the base unit GE has a switchover unit UM. By way of the switchover unit UM, in the event of a failure of or interruption to the supply network, a switch occurs to supplying the load L with the DC voltage by the at least one battery module BM.

The at least one battery module BM has at least two accumulator units or rechargeable battery packs A1, . . . , A4, which are arranged in series. Each rechargeable battery pack A1, . . . , A4 has its own internal exhaustive discharge monitoring, via which the respective rechargeable battery pack A1, . . . , A4 can be switched into at least one protection mode when at least one voltage threshold value (e.g., the respective final discharge voltage) is fallen below. In the protection mode, for instance, a discharging of the rechargeable battery pack A1, . . . , A4 is stopped and a charging current is limited to a relatively low current value (e.g., 150 mA) by the internal exhaustive discharge monitoring. In a battery module BM, three or, as shown in FIG. 1, four accumulator units A1, . . . , A4 may be arranged in series, for instance. A lithium ion or lithium iron phosphate rechargeable battery pack may be used as accumulator unit A1, . . . , A4, for instance.

Furthermore, the at least one battery module BM comprises a load network BL, which is arranged in parallel with the accumulator units A1, . . . , A4, for instance. The load network BL, for instance, consists of load units that are arranged in series and can be connected in accordance with a defined order. The respective load unit comprises, for instance, at least one resistor and a switching element arranged in series with the resistor, via which the respective load unit or the at least one resistor can be connected or disconnected.

Furthermore, the at least one battery module BM has a controller unit KE, which may comprise a microcontroller, for instance. The controller unit KE is configured to actuate the load network BL and to evaluate voltage drops at the respective accumulator units A1, . . . , A4 determined via the load network BL. Furthermore, parameters such as final charge voltage, maximum charging current, final discharge voltage, accumulator type, or accumulator size, for the accumulator units A1, . . . , A4 or for the battery module BM may be stored in the controller unit KE. The controller unit KE is also configured for communication with the base unit GE of the uninterruptible power supply or with the control unit SE of the base unit GE and, e.g., the parameters such as final charge voltage, maximum charging current, final discharge voltage, accumulator type, or accumulator size, of the battery module BM may be transferred to the control unit SE of the base unit GE when starting up the power supply system, for instance.

To this end, a communication connection COM is provided, via which the base unit GE or the associated control unit SE and the at least one battery module BM or the associated controller unit KE may exchange parameter data and/or control signals. The communication connection COM can use the connection lines Lp, Ln, in which the inverse polarity protection unit P is arranged, as a signal basis or as a return line for data and/or signal exchange. This means that the communication connection COM, for instance, as shown in FIG. 1, uses the negative connection line Ln, in which the inverse polarity protection unit P is arranged, as a signal basis. Furthermore, not shown in FIG. 1 for the purpose of simplicity, a line may be provided for an auxiliary supply (e.g., 13 V) for the controller unit KE of the battery module BM.

Moreover, the battery module BM may have a display unit, by way of which a current state of the at least one battery module BM, such as charging operation, or "defective battery", may be indicated. Light-emitting diodes, via which the state of the battery module is indicated via color and/or flashing signals, may be used as display unit.

Figure 2:
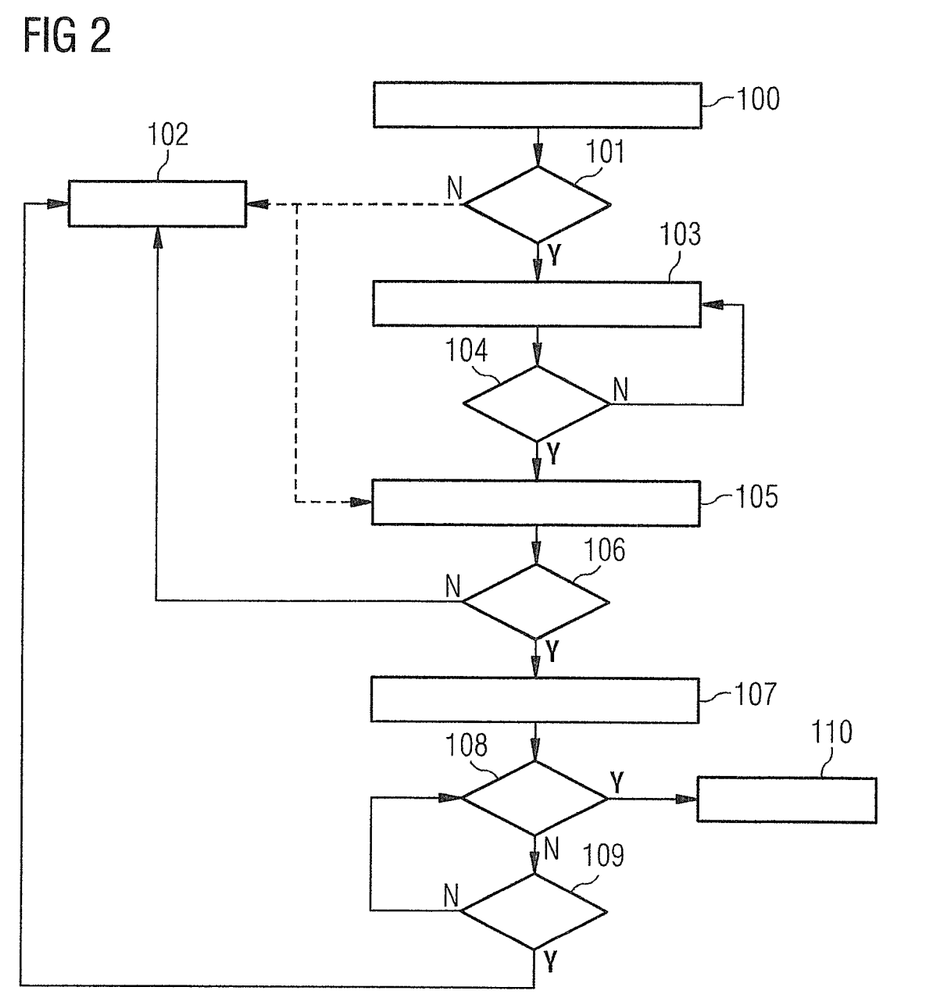
FIG. 2 shows a schematic representation of an exemplary sequence of the method in accordance with the invention for reconditioning an exhausted battery module in an uninterruptible power supply system in accordance with the invention.

FIG. 2 shows a schematic representation of an exemplary sequence of the method in accordance with the invention for reconditioning an exhausted battery module BM in an uninterruptible power supply system in accordance with the invention. In a start phase 100, for instance, after connecting a new battery module BM to the base unit, after longer backup operation, after a switch-off time of the power supply, etc., a network-side supply Ue is switched on. After starting the network-side supply Ue, a terminal voltage $U_K$ of the at least one battery module BM is determined, for instance, at the positive connection line Lp or at the positive terminal of the battery module BM.

In a comparison phase 101 for the terminal voltage $U_K$, the terminal voltage $U_K$ is compared with a predefinable threshold value. If the determined terminal voltage $U_K$ surpasses the predefinable threshold value, then a normal charging operation 102 can be transitioned into or a communication phase 105 performed, in which the inverse polarity protection unit P is permanently switched on and a communication is established between the base unit GE or the associated control unit SE and the at least one battery module BM or the associated controller unit KE via the communication connection COM.

If the determined terminal voltage $U_K$ falls below the predefinable threshold value, then after a predefinable waiting time (e.g., 10 minutes) has elapsed, then in a checking phase 103 the inverse polarity protection unit P, which is arranged in one of the terminals or in one of the connection lines Lp, Ln (e.g., in the negative terminal or in the negative connection line Ln) of the base unit GE for the at least one battery module BM, is switched on for a short time or for a predefinable time pulse (e.g., 0.5 seconds). In a communication checking phase 104, it is examined whether, during the activation of the inverse polarity protection unit P for a short time, a communication between the base unit GE or the associated control unit SE and the at least one battery module BM or the associated controller unit KE via the communication connection COM occurs.

If no signal from the at least one battery module is received by the base unit GE via the communication connection COM, then the checking phase 103 and the communication checking phase 104 are performed once again (optionally after checking the connection lines Lp, Ln or whether the battery module BM is linked to the base unit GE with the correct polarities).

If the at least one battery module BM or the associated controller unit KE contacts the base unit GE, then this is a sign that the at least one battery module BM is connected to the base unit GE correctly, i.e., not with inverse polarity. Thus, the method in accordance with the invention is continued with the communication phase 105.

In the communication phase 105, the inverse polarity protection unit P is permanently switched on and the communication between base unit GE and at least one battery module BM is established via the communication connection COM. Here, parameters of the accumulator units A1, . . . , A4 or of the battery module BM, such as accumulator type, accumulator size, final charge voltage, maximum charging current, or final discharge voltage, for instance, are transferred to the control unit SE of the base unit GE from the battery module BM or from the associated controller unit KE. Furthermore, in the communication phase 105, the controller unit KE of the battery module BM is prompted by the control unit SE of the base unit GE to perform an examination of the accumulator units A1, . . . , A4 with the aid of the load network BL. The examination of the accumulator units A1, . . . , A4 may be performed before each charging process of the battery module BM, for instance.

In this context, in an accumulator checking phase 106, a respective voltage drop may be determined via the load network at each of the accumulator units A1, . . . , A4. The voltage drop determined for the respective accumulator unit A1, . . . , A4 is then evaluated in the controller unit KE and, in doing so, compared with a predefined minimum voltage (e.g., a final discharge voltage for the rechargeable battery type of the respective accumulator unit).

In order to be able to determine an associated voltage drop for each of the accumulator units A1, . . . , A4 arranged in series, the load network is arranged in parallel with the accumulator units A1, . . . , A4 and consists of load units that are arranged in series and comprise at least one resistor and one switching element in series. Via the respective switching elements in the load units, these may be connected in a predefinable order via actuation by the controller unit KE for the determination of the respective voltage drop. Here, for determining a first voltage drop at a first accumulator unit A1 for instance, the first load unit, which is arranged in parallel with the first accumulator unit A1, is connected. The first voltage drop determined for the first accumulator unit A1 is then compared with the predefined minimum voltage. To determine a second voltage drop at a second accumulator unit A2, a second load element, which is arranged in parallel with the second accumulator unit A2, is connected to the first load element, for instance. The second voltage drop determined for the second accumulator unit A2 is then likewise compared with the predefined minimum voltage. The procedure is followed in the same manner for the further accumulator units A3, A4, until an associated voltage drop has been determined and compared with the predefined minimum voltage, e.g., by the controller unit KE, for all accumulator units A1, . . . , A4 used in the battery module BM.

If it is ascertained in the accumulator checking phase 106 that none of the accumulator units A1, . . . , A4 of the at least one battery module BM fall below the predefined minimum voltage, i.e., that none of the accumulator units A1, . . . , A4 have been switched into a protection mode by the associated internal exhaustive discharge monitoring in each case or is defective, then the normal charging operation 102 of the battery module can be performed, i.e., a charging of the battery module BM with a maximum possible charging current $I_{LS}$.

If, however, it is ascertained in the accumulator checking phase 106 that at least one accumulator unit A1, . . . , A4 has a voltage drop, by which the predefined minimum voltage is fallen below, then the method is started in a reconditioning phase 107 for the at least one battery module BM. This means that, in this context, the charging unit LE in the base unit is shifted into a battery reconditioning mode, for instance, where threshold values for charging parameters (e.g., maximum permissible charging voltage, or maximum possible charging current) are implemented. In so doing, a predefined charging voltage $U_{LS}$ is applied to the at least one battery module BM. Furthermore, via the display unit of the battery module BM, for instance, it is possible for the exhaustive discharge state or the battery reconditioning mode to be indicated by slowly flashing a red light-emitting diode.

In this context, the predefined charging voltage is applied to the at least one battery module BM, and a check is performed to determine which charging current $I_{LS}$ is received by the at least one battery module BM, until either a time check 108 results in a predefinable period of time such as 12 hours, for instance, or a charging current check 109 results in a predefinable current value being surpassed by a charging current $I_{LS}$ currently determined in the base unit GE. This means that if it is ascertained in the time check 108 that the predefinable period of time has been reached or exceeded, without the charging current $I_{LS}$ currently determined in the base unit GE having reached or exceeded the predefinable current value (e.g. 500 mA), then the method is ended with a display phase 110. In the display phase 110, for instance, the display unit of the battery module BM (e.g., rapid flashing of a red light-emitting diode) is used to indicate that the battery module is defective and, e.g., must be changed. As an alternative or in addition, it is also possible to indicate which of the accumulator units A1, . . . , A4 of the battery module is to be changed.

If it is ascertained in the current check 109, before the predefinable period of time elapses, that the charging current $I_{LS}$ currently determined in the base unit GE has exceeded the predefinable current value (e.g., 500 mA) then, e.g., after a predefinable time (e.g. 1 minute) it is possible for the charging unit LE to exit the battery reconditioning mode and to transition into a normal charging operation 102 with the maximum possible or maximum permissible charging current. In this context, the normal charging operation can be indicated via the display unit of the battery module BM e.g. by means of flashing or showing a green light-emitting diode.

Figure 3:
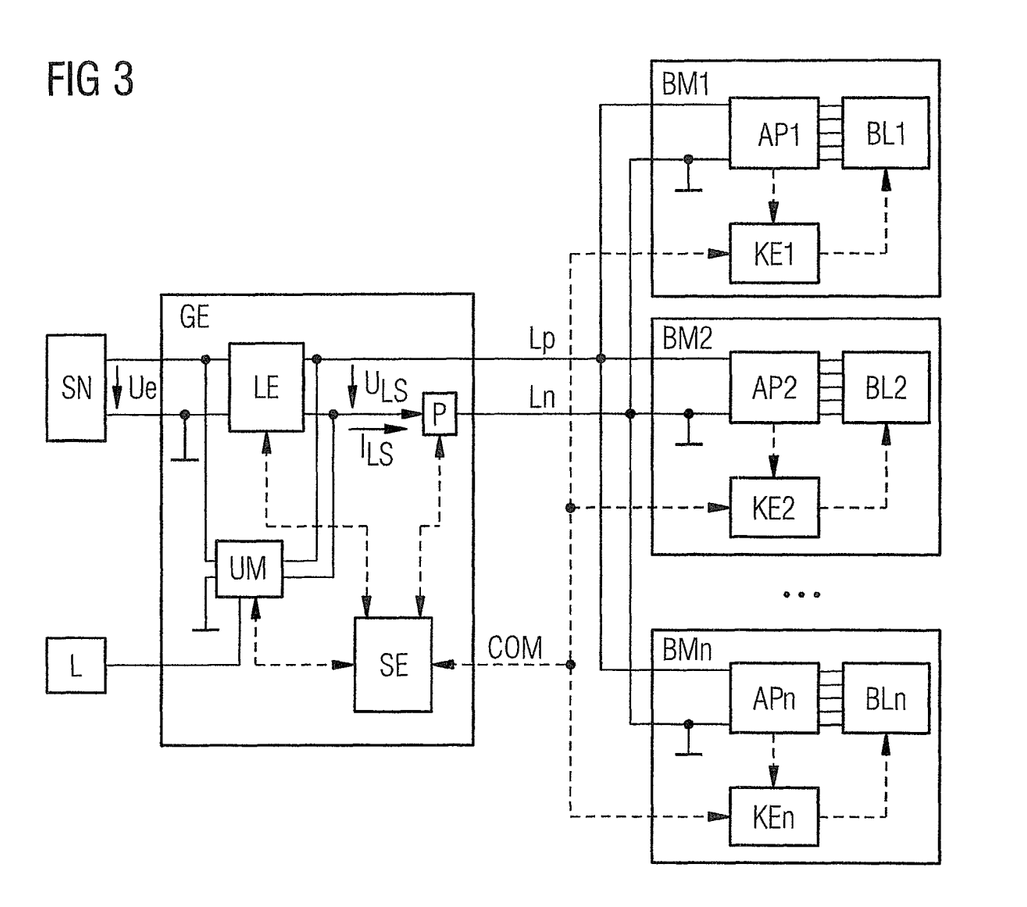
FIG. 3 shows a schematic and exemplary representation of the uninterruptible power supply system in accordance with the invention with a base unit and a plurality of battery modules linked in parallel.

FIG. 3 shows an exemplary and schematic representation of the uninterruptible power supply system according to in accordance with the invention with a base unit GE, where a plurality of battery modules BM1, . . . , BMn (e.g., up to five) are linked to the base unit GE in parallel via the positive and negative connection line Lp, Ln. The base unit GE once again has a charging unit LE, a switchover unit UM and also a control unit SE. In the negative connection line LN of the base unit GE, an inverse polarity protection unit P is provided once again, which may be arranged in one of the connection lines Lp, Ln, e.g., the negative connection line Ln. Furthermore, it is possible for the base unit GE or the associated control unit SE to exchange parameter and/or signal data with the linked battery modules B1, . . . , Bn or the respective controller units KE1, . . . , KEn via a communication connection COM.

The linked battery modules BM1, . . . , BMn in turn each have at least two accumulator units AP1, . . . , APn arranged in series and each with associated internal exhaustive discharge monitoring in. For the sake of simplicity, the accumulator units of the individual battery modules BM1, . . . , BMn are shown as an overall unit AP1, . . . , APn. Furthermore, each battery module BM1, . . . , BMn comprises at least one controller unit KE1, . . . , KEn and also a load network BL1, . . . , BLn arranged in parallel with the accumulator units AP1, . . . , APn.

In the case of a parallel connection of the plurality of battery modules BM1, . . . , BMn, the method in accordance with the invention will only be run through if all battery modules BM1, . . . , BMn have at least one rechargeable battery pack AP1, . . . , APn, which have been switched into a protection mode via the respective exhaustive discharge monitoring. In the case of at least one battery module BM1, . . . , BMn, which has a normal functionality, i.e., no rechargeable battery pack in a protection mode, a normal charging operation 102 is performed by the base unit GE. Only when the predefined final charge voltage has been reached by the at least one battery module BM1, . . . , BMn without rechargeable battery pack AP1, . . . , APn in a protection mode (i.e., the normal charging process 102 of this at least one battery module BM1, . . . , BMn has been concluded), is the at least one battery module BM1, . . . , BMn, in which at least one rechargeable battery pack AP1, . . . , APn is in a protection mode, charged with the aid of the method in accordance with the invention or identified as defective thereby.

If, in a parallel linking of a plurality of battery modules BM1, . . . , BMn to a base unit GE, at least one of the battery modules BM1, . . . , BMn has at least one rechargeable battery pack AP1, . . . , APn in a protection mode and is therefore not available, then an indication of an energy reserve is adapted accordingly for instance.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for reconditioning an exhausted battery module in an uninterruptible power supply system with at least one base unit and at least one battery module including a plurality of accumulator units each having an associated internal exhaustive discharge monitoring, the at least one battery module being linked to the at least one base unit via connection lines, the method comprising:
determining, after starting a network-side supply, a terminal voltage of the at least one battery module and comparing the terminal voltage with a predefinable threshold value;
switching on an inverse polarity protection unit arranged in one connection line of the connection lines for a predefinable time pulse, when the terminal voltage has fallen below the predefinable threshold value after a predefinable waiting time has elapsed;
switching on the inverse polarity protection unit permanently and, in at least one battery module, determining a respective voltage drop via a load network at each of the plurality of accumulator units and comparing the respective voltage drop with a predefined minimum voltage, when a communication between the at least one base unit and the at least one battery module is ascertained during the predefinable time pulse; and
applying a predefined charging voltage to the at least one battery module until one of (i) a predefinable period of time is exceeded and (ii) a predefinable current value is surpassed by a charging current determined in the base unit, when at least one of the voltage drops determined at the respective accumulator units falls below the predefined minimum voltage.

2. The method as claimed in claim 1, wherein load units are connected by the load network in accordance with a predefinable order to determine the respective voltage drop at the respective accumulator unit.

3. The method as claimed in claim 1, wherein the respective voltage drops at the respective accumulator units of the battery module are determined via the load network before each charging process of the battery module.

4. The method as claimed in claim 2, wherein the respective voltage drops at the respective accumulator units of the battery module are determined via the load network before each charging process of the battery module.

5. The method as claimed in claim 1, wherein an exhaustive discharge state is indicated by the at least one battery module during the predefinable period of time.

6. The method as claimed in claim 1, wherein a "defective battery module" state is indicated by the at least one battery module after expiration of the predefinable period of time.

7. The method as claimed in claim 1, wherein a switch to a normal charging operation occurs and the normal charging operation is indicated by the at least one battery module when the predefinable current value is surpassed by the charging current determined in the base unit.

8. An uninterruptible power supply system, comprising:
   at least one base unit;
   at least one battery module including a plurality of accumulator units each having associated exhaustive discharge monitoring;
   at least one communication connection is provided for exchanging control signals and providing communication between the at least one base unit and the at least one battery module;
   wherein the at least one battery module is linked to the base unit via connection lines;
   wherein the at least one base unit comprises an inverse polarity protection unit which is arranged in one connection line of the connection lines;
   wherein the at least one battery module includes a load network for determining voltage drops at each of the plurality of accumulator units; and
   wherein the communication connection utilizes the connection line, in which an inverse polarity protection unit is arranged, as a signal basis;
   wherein the uninterruptable power supply is configured to:
      determine, after starting a network-side supply, a terminal voltage of the at least one battery module is determined and compare the terminal voltage with a predefinable threshold value;
      switch on the inverse polarity protection unit arranged in the one connection line of the connection lines for a predefinable time pulse, when the terminal voltage has fallen below the predefinable threshold value after a predefinable waiting time has elapsed;
      switch on the inverse polarity protection unit permanently and, in the at least one battery module, determine a respective voltage drop via the load network at each of the plurality of accumulator units and compare the respective voltage drop with a predefined minimum voltage, when the communication between the at least one base unit and the at least one battery module is ascertained during the predefinable time pulse; and
      apply a predefined charging voltage to the at least one battery module until one of (i) a predefinable period of time is exceeded and (ii) a predefinable current value is surpassed by a charging current determined in the base unit, when at least one of the voltage drops determined at the respective accumulator units falls below the predefined minimum voltage.

9. The uninterruptible power supply system as claimed in claim 8, wherein the at least one base unit comprises at least one charging unit for implementing charging and discharging processes and a control unit for actuating the charging unit and for evaluating measurement values, and wherein the at least one battery module includes a controller unit for communicating with the at least one base unit, actuating the load network and for evaluating voltage drops determined via the load network.

10. The uninterruptible power supply system as claimed in claim 8, wherein the at least one battery module includes a display unit, via which a current state of the at least one battery module is indicated.

11. The uninterruptible power supply system as claimed in claim 9, wherein the at least one battery module includes a display unit, via which a current state of the at least one battery module is indicated.

12. The uninterruptible power supply system as claimed in claim 8, wherein the load network of the at least one battery module consists of load units arranged in series, each comprising at least one resistor arranged in series with a switching element and being connectable in a predefinable order.

13. The uninterruptible power supply system as claimed in claim 9, wherein the load network of the at least one battery module consists of load units arranged in series, each comprising at least one resistor arranged in series with a switching element and being connectable in a predefinable order.

14. The uninterruptible power supply system as claimed in claim 10, wherein the load network of the at least one battery module consists of load units arranged in series, each comprising at least one resistor arranged in series with a switching element and being connectable in a predefinable order.

15. The uninterruptible power supply system as claimed in claim 8, wherein the inverse polarity protection unit is configured as a switching unit.

16. The uninterruptible power supply system as claimed in claim 9, wherein the inverse polarity protection unit is configured as a switching unit.

17. The uninterruptible power supply system as claimed in claim 10, wherein the inverse polarity protection unit is configured as a switching unit.

18. The uninterruptible power supply system as claimed in claim 12, wherein the inverse polarity protection unit is configured as a switching unit.

* * * * *